US011060623B2

(12) United States Patent
Carpenter

(10) Patent No.: US 11,060,623 B2
(45) Date of Patent: Jul. 13, 2021

(54) WATER MANAGEMENT SYSTEM

(71) Applicant: Scott Carpenter, Mobile, AL (US)

(72) Inventor: Scott Carpenter, Mobile, AL (US)

( * ) Notice: Subject to any disclaimer, the term of this patent is extended or adjusted under 35 U.S.C. 154(b) by 0 days.

(21) Appl. No.: 16/231,046

(22) Filed: Dec. 21, 2018

(65) Prior Publication Data

US 2019/0195374 A1  Jun. 27, 2019

Related U.S. Application Data

(60) Provisional application No. 62/609,091, filed on Dec. 21, 2017.

(51) Int. Cl.
| | |
|---|---|
| *F16K 11/22* | (2006.01) |
| *F16K 11/20* | (2006.01) |
| *F17D 1/08* | (2006.01) |
| *E03B 1/04* | (2006.01) |
| *E03B 7/07* | (2006.01) |
| *E03B 7/09* | (2006.01) |

(52) U.S. Cl.
CPC .............. *F16K 11/20* (2013.01); *E03B 1/04* (2013.01); *E03B 7/071* (2013.01); *F17D 1/082* (2013.01); *F17D 1/084* (2013.01); *E03B 7/095* (2013.01)

(58) Field of Classification Search
CPC ........ F16K 11/20; F16K 11/207; F16K 11/22; F16K 27/003; E03B 7/071; Y10T 137/87877
See application file for complete search history.

(56) References Cited

U.S. PATENT DOCUMENTS

| | | | |
|---|---|---|---|
| 3,473,552 A | 11/1965 | Schmitz | |
| 3,473,553 A | 11/1966 | Collins | |
| 3,370,609 A | * 2/1968 | Botnick | .................. F16K 11/20 |
| | | | 137/607 |
| 3,770,002 A | 11/1973 | Brown | |
| 4,380,243 A | 4/1983 | Braley | |
| 4,572,113 A | 2/1986 | Baughman | |
| 4,736,763 A | 4/1988 | Britton et al. | |
| 4,765,360 A | 8/1988 | Baird | |
| 4,805,662 A | 2/1989 | Moody | |
| 4,814,752 A | 3/1989 | Lehman | |
| 4,940,861 A | 7/1990 | Rizzuto | |
| 5,029,605 A | 7/1991 | Dowling et al. | |
| 5,091,715 A | 2/1992 | Murphy | |
| 5,134,683 A | 7/1992 | Powell | |
| 5,188,143 A | 2/1993 | Krebs | |

(Continued)

FOREIGN PATENT DOCUMENTS

| | | |
|---|---|---|
| CA | 2175005 A1 | 10/1997 |
| CN | 202379762 U | 8/2012 |

(Continued)

*Primary Examiner* — Reinaldo Sanchez-Medina
(74) *Attorney, Agent, or Firm* — George L Williamson

(57) ABSTRACT

A water management system is provided. The system includes a manifold with ports adapted to connect the manifold to piping that connects to various water fixtures in a home or building. Each port has a flow sensor and an actuated valve configured to shut off flow to a fixture in the event of a leak in order to mitigate damage from the leak. Water flow occurring due to a leak may be detected and mitigated based on input provided by the flow sensor and a motion sensor, a button switch, or a timer switch.

12 Claims, 9 Drawing Sheets

(56) References Cited

U.S. PATENT DOCUMENTS

| | | | |
|---|---|---|---|
| 5,205,487 A * | 4/1993 | Paulk, Jr. | A01G 25/16 |
| | | | 239/74 |
| 5,229,750 A | 7/1993 | Welch et al. | |
| 5,334,973 A | 8/1994 | Furr | |
| 5,345,224 A | 9/1994 | Brown | |
| 5,428,347 A | 6/1995 | Barron | |
| 5,539,383 A | 7/1996 | Chin | |
| 5,632,302 A | 5/1997 | Lenoir | |
| 5,655,561 A | 8/1997 | Wendel et al. | |
| 5,713,387 A | 2/1998 | Armenia et al. | |
| 5,844,492 A | 12/1998 | Buffin, Sr. | |
| 5,857,482 A | 1/1999 | Dowling | |
| 5,870,024 A | 2/1999 | Arvelo | |
| 5,877,689 A | 3/1999 | D'Amico | |
| 5,975,114 A | 11/1999 | Stahl et al. | |
| 5,992,218 A | 11/1999 | Tryba et al. | |
| 6,003,536 A | 12/1999 | Polverari et al. | |
| 6,024,116 A | 2/2000 | Almberg et al. | |
| 6,035,699 A | 3/2000 | Padante | |
| D423,973 S | 5/2000 | Labatt | |
| 6,084,520 A | 7/2000 | Salvucci | |
| 6,135,133 A | 10/2000 | Ridgeway | |
| 6,147,613 A | 11/2000 | Doumit | |
| 6,253,785 B1 | 7/2001 | Shumake et al. | |
| 6,273,021 B1 | 8/2001 | Pembroke | |
| 6,276,309 B1 | 8/2001 | Zeek | |
| 6,310,555 B1 | 10/2001 | Stern | |
| 6,317,051 B1 | 11/2001 | Cohen | |
| 6,336,469 B1 | 1/2002 | Nixon et al. | |
| 6,369,714 B2 | 4/2002 | Walter | |
| 6,523,562 B2 | 2/2003 | Harper | |
| 6,526,807 B1 | 3/2003 | Doumit et al. | |
| 6,543,471 B1 | 4/2003 | Carrol | |
| 6,675,826 B1 | 1/2004 | Newman et al. | |
| 6,792,967 B1 | 9/2004 | Franklin | |
| 6,802,084 B2 | 10/2004 | Ghertner et al. | |
| 6,873,263 B1 | 3/2005 | Hohman | |
| 6,892,751 B2 | 5/2005 | Sanders | |
| 6,939,470 B2 | 9/2005 | Baarman | |
| 6,978,659 B2 | 12/2005 | Phillips et al. | |
| 7,044,154 B2 | 5/2006 | Henderson et al. | |
| 7,057,507 B1 | 6/2006 | Sandifer | |
| 7,084,777 B2 | 8/2006 | Ninberg | |
| 7,114,516 B2 | 10/2006 | Ito | |
| 7,283,913 B2 | 10/2007 | Garnaes | |
| 7,421,784 B2 | 9/2008 | Akkala et al. | |
| 7,549,435 B2 | 6/2009 | Walter | |
| 7,561,057 B2 | 7/2009 | Kates | |
| 7,562,673 B1 | 7/2009 | Martin et al. | |
| 7,574,896 B1 | 8/2009 | Cooper | |
| 7,926,504 B2 | 4/2011 | Sharp | |
| 8,130,107 B2 * | 3/2012 | Meyer | G01M 3/18 |
| | | | 137/312 |
| 8,402,984 B1 | 3/2013 | Ziegenbein et al. | |
| 8,430,115 B2 | 4/2013 | Stieb | |
| 9,581,264 B1 * | 2/2017 | Ericksen | A01G 25/16 |
| 2002/0033759 A1 | 3/2002 | Morello | |
| 2002/0148515 A1 | 10/2002 | Coffey | |
| 2003/0015245 A1 * | 1/2003 | Bender | G05D 23/022 |
| | | | 137/883 |
| 2003/0066340 A1 | 4/2003 | Hassenflug | |
| 2004/0206405 A1 | 10/2004 | Smith et al. | |
| 2005/0275547 A1 | 12/2005 | Kates | |
| 2006/0169321 A1 * | 8/2006 | Houle | F24H 9/0005 |
| | | | 137/312 |
| 2006/0208912 A1 | 9/2006 | Fiorletta et al. | |
| 2008/0266124 A1 | 10/2008 | Wofford | |
| 2010/0315245 A1 | 12/2010 | Wofford | |
| 2011/0291845 A1 | 12/2011 | Rice | |
| 2012/0007744 A1 | 1/2012 | Pal et al. | |
| 2012/0275927 A1 | 11/2012 | Rhim | |
| 2012/0312404 A1 * | 12/2012 | Choi | F24D 3/1075 |
| | | | 137/883 |
| 2013/0092242 A1 | 4/2013 | Guy | |
| 2014/0020166 A1 * | 1/2014 | Metcalf | E03D 5/10 |
| | | | 4/301 |
| 2015/0114490 A1 * | 4/2015 | Carpenter | E03B 7/072 |
| | | | 137/460 |
| 2016/0076909 A1 * | 3/2016 | Klicpera | F16K 31/02 |
| | | | 73/198 |
| 2016/0163177 A1 * | 6/2016 | Klicpera | E03B 7/071 |
| | | | 137/59 |
| 2016/0226732 A1 * | 8/2016 | Kim | H04W 12/04031 |
| 2018/0127957 A1 * | 5/2018 | Enev | G01M 3/2815 |

FOREIGN PATENT DOCUMENTS

| | | |
|---|---|---|
| DE | 3644053 A1 | 6/1988 |
| GB | 2472678 A | 2/2011 |
| JP | 63131953 A | 11/1986 |
| JP | 4037635 B2 | 1/2008 |
| JP | 2012017907 A | 1/2012 |

* cited by examiner

WATER MANAGEMENT SYSTEM

CROSS-REFERENCE TO RELATED APPLICATIONS

This application claims priority to U.S. Provisional Patent Application No. 62/609,091 entitled "WATER MANAGEMENT SYSTEM," filed Dec. 21, 2017, which application is incorporated herein in its entirety by reference.

FIELD OF THE INVENTION

The subject matter of the present disclosure generally relates to a water management system. More particularly, embodiments of the present disclosure relate to a water management system for managing water supply from a water source to a plurality of fixtures.

BACKGROUND

Traditional piping systems based on copper or hard metal pipes and rigid connectors are giving way to new methods. One new method for water distribution gaining acceptance in the home and commercial building industry is the use of manifold plumbing systems. Unlike the conventional copper-pipe trunk and branch infrastructure, manifold plumbing systems function like circuit breakers for water.

Manifold plumbing systems are control centers for hot and cold water that feed flexible cross-linked polyethylene (PEX) supply lines to individual fixtures. Manifolds, together with PEX lines, offer installation-related cost advantages over conventional rigid pipe plumbing systems. The unique features of PEX piping make it ideal for use in manifold-type system designs, commonly referred to as home-run plumbing systems. In this design, all fixtures are fed from dedicated piping that runs directly and unbroken from a central manifold or manifolds.

Whether a manifold or conventional plumbing system, the first step in stopping a leaking fixture or pipe is notification that a leak exists. Generally, a water leak is silent, or very quiet. Attempts to address these problems can be found in U.S. Pat. No. 5,428,347 and U.S. Publication Nos. 10/0315245 and 06/0208912. However each one of these references suffers from disadvantages. Primarily, an audio or visual alarm cannot automatically shut down the leaking water supply system. An alarm is simply made to notify the user responsible for correcting the leak. Because an alarm is useless if no one is there to hear it, leak detection systems based on audio or visual alarms must be equipped with other shut-off elements. Furthermore, the types of alarms available measure leakage from only one pipe or fixture. Thus, a complicated system of alarms must be equipped to fully analyze leakage from the various fixtures and appliances present in a home, apartment complex, or commercial building.

Because alarms alone cannot automatically shut off water supplies, attempts have been made to solve this problem as found in U.S. Pat. No. 6,675,826 and U.S. Patent Publication No. 13/0092242. However, each of these references suffers disadvantages. First, the disclosures are used to measure one, or only a few, water lines. Additionally, the disclosures require adding additional pieces to the water line and/or fixture. Furthermore, if a leak is detected, the entire water supply is shut-off, thus shutting off water to other fixtures and appliances.

Of all the fixtures and appliances, one of the most dangerous and destructive is a leaking or burst hot water heater or hot water heater pipe. Not only does a hot water heater generally hold a large amount of water, but the water contained therein is extremely hot. A sudden discharge of the hot water stored inside of the water heater could cause extreme burning to people or domestic animals. In addition, a large amount of rushing water could quickly flood basements or other areas of the home.

Information relevant to attempts to address these problems can be found in U.S. Pat. Nos. 5,345,224; 5,229,750; and 4,572,113; and U.S. Publication Nos. 12/0275927 and 04/0206405. However, each one of these references suffers from one or more disadvantages.

First, the holding reservoir used in many of the disclosures may also have an undetected leak. Additionally, the reservoir may overflow if a pipe bursts, thus creating a more dangerous situation, as an increased rush of hot water will be released when the reservoir overflows. Another disadvantage is that some systems were created for draining water from the system before leaving the home or building for an extended period of time during the winter, not quickly detecting and draining leaks. Other systems do not automatically shut off a leaking or burst hot water heater. Another disadvantage is that many systems do not drain the water left in the water heater. Another disadvantage is that many systems do not automatically turn off the hot water heater when a leak has been detected, or when the water heater has been drained. Another disadvantage is that many systems do not automatically turn the power back on when the tank has been refilled.

As noted from the foregoing, problems exist in the field relating to leak detection, leak control, and water management systems. Thus, a need exists in the art for a water management system that overcomes the disadvantages of the current systems and methods.

SUMMARY

A water management system and method for managing water supply from a water source to a plurality of fixtures are provided. The system is generally designed to automatically detect leaks in water lines and to automatically shut off water flow to any line in which a leak is detected in order to mitigate damage caused by water leaks. The system includes a manifold having an inlet adapted to receive water from a water source and a plurality of ports for supplying water from the manifold to a plurality of fixtures. Each port within the manifold has an actuated valve for regulating water flow from an interior of the manifold to the port to which the actuated valve corresponds and, in turn, the fixture to which the port supplies water. The actuated valve of each port is operably connected to a switch and/or one or more sensors and is adapted to transition to a closed configuration based on input provided by the switch and/or one or more sensors. The use and type of switch and/or one or more sensors operably connected to the actuated of valve of each port may be based on the type of fixture to which the port is supplying or is intended to supply. In some embodiments, the use and type of switch and/or one or more sensors for operable connection to an actuated valve may be selected based on whether the fixture is a manually operated indoor fixture, a manually operated outdoor fixture, or a fixture that operates on a cycle.

The foregoing summary has outlined some features of the system and methods of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purposes of the system and methods disclosed herein. Those skilled in the pertinent art should also realize that such equivalent designs or modifications do not depart from the scope of the system and methods of the present disclosure.

DESCRIPTION OF THE DRAWINGS

These and other features, aspects, and advantages of the present disclosure will become better understood with regard to the following description, appended claims, and accompanying drawing where:

DETAILED DESCRIPTION

Figure 1:
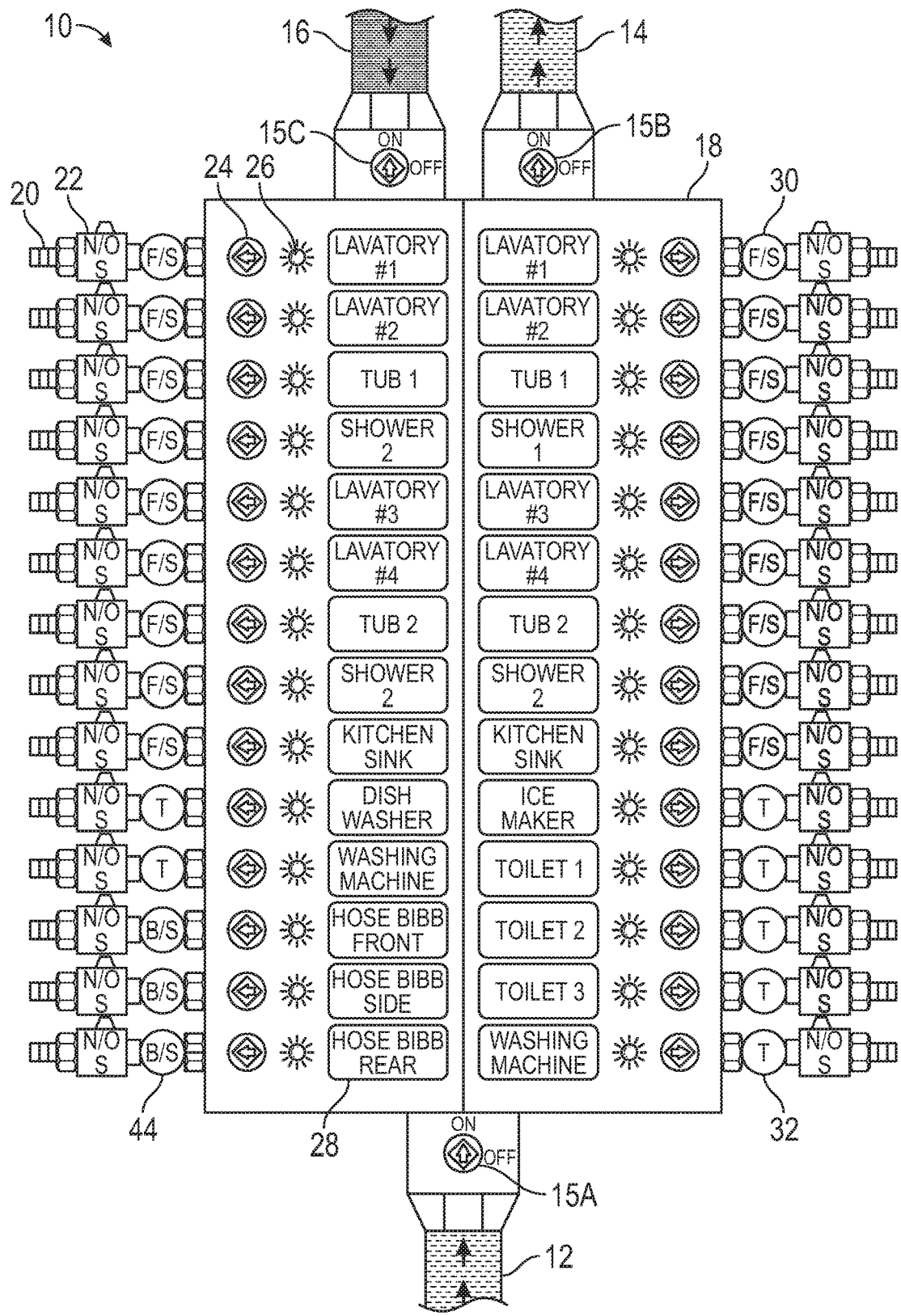
FIG. 1 shows an elevational view of one embodiment of a manifold having features consistent with the principles of the present disclosure for use in a water management system.

In the Summary above and in this Detailed Description, and the Claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components, or can contain at least one component chosen from A, B, or C.

Where reference is made herein to a method comprising two ore more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Turning now to the drawings, FIGS. 1-9 illustrate preferred embodiments of a water management system or certain components thereof. The system is designed to automatically detect leaks in water lines and to automatically shut off water flow to any line in which a leak is detected in order to mitigate damage caused by water leaks. The system includes a water distribution manifold 10 having a plurality of individual ports 20 that supply water to a designated water fixture, e.g., a sink, bathtub, shower, toilet, or dishwasher. The manifold 10 has at least one chamber, which may be a pipe or other type of vessel, that branches off into the individual ports 20.

In some embodiments, the manifold 20 have two chambers, a hot water chamber 19 and a cold water chamber 17, for supplying hot and/or cold water to a designated fixture. Both chambers 17, 19 may be contained within a common housing unit 18. The manifold 10 has a cold water inlet 12 that supplies water to the manifold 10 from a water source, such as a municipal water supply. The cold water inlet 12 is fluidly connected to the cold water chamber 17, which, in turn, is fluidly connected to and supplies cold water directly to ports 20 intended for fixtures 35 requiring cold water. In some embodiments, the system may further comprise a water heater 100. In such embodiments, the cold water chamber 17 may have an outlet 14 fluidly connected thereto that supplies water to a water heater 100. Cold water supplied to the water heater 100 from the cold water chamber 17 may be heated and subsequently directed to the hot water chamber 19 via an inlet 16 fluidly interconnecting the water heater 100 and hot water chamber 19. The hot water chamber 17 is fluidly connected to and supplies hot water directly to ports 20 intended for fixtures 35 requiring hot water.

Each port 20, which includes both cold water and hot water ports, supplies water to a designated fixture 35. Some fixtures 35, such as a shower, are supplied with water from both a cold water port and a hot water port. Other fixtures, such as a toilet, may be supplied by only a cold water port. Each port 20 includes an actuated valve 22, such as a solenoid valve, which is normally in an open configuration, for controlling water flow through the port 20 automatically. Each port 20 may further include a manual shut off valve 24 for controlling water flow through the port manually. In some embodiments, each individual port 20 may have a label 28 associated therewith that identifies the fixture 35 supplied by the port 20. In one embodiment, the labels 28 associated with the ports 20 may be of red or blue coloration to identify whether the port 20 supplies hot or cold water, respectively. In some embodiments, each individual port 20 preferably may have a light associated therewith that indicates when the actuated valve 22 corresponding to the port 20 is closed due to a leak detected in a water line connected to the port 20.

FIG. 1 shows a water distribution manifold 10 in accordance with one embodiment of the present disclosure that may be utilized with the present water management system.

Figure 7:
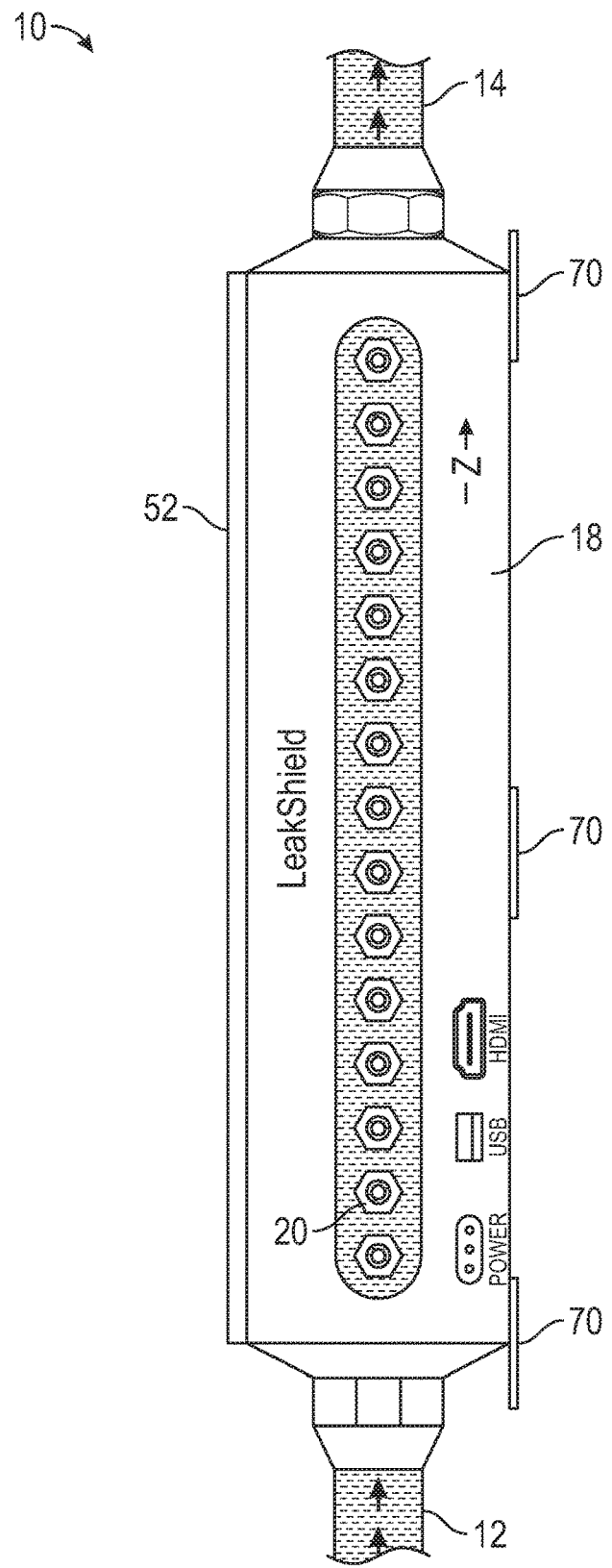
FIG. 7 shows a side elevational view of one embodiment of a manifold having features consistent with the principles of the present disclosure apparatus for use in a water management system.
Figure 9:
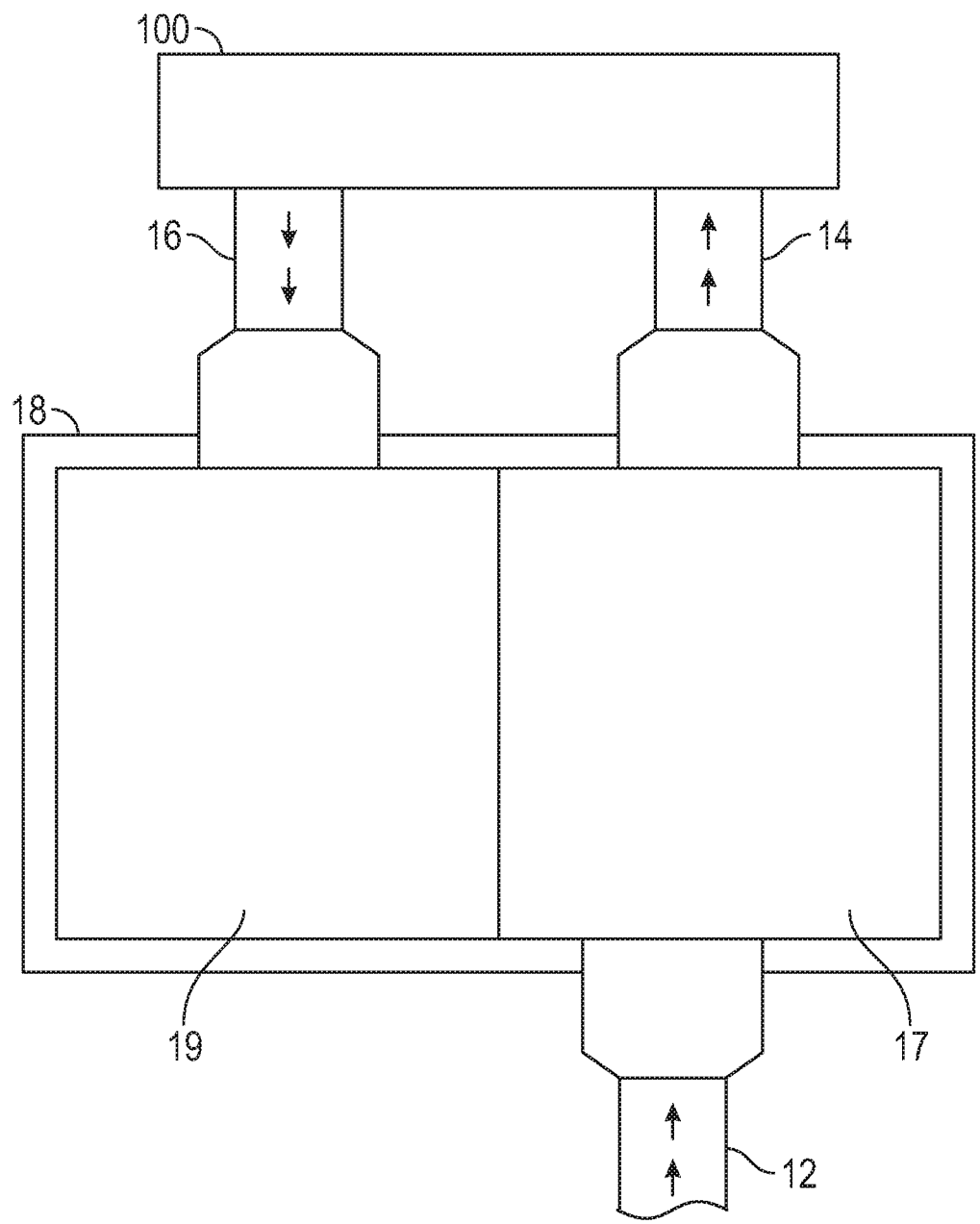
FIG. 9 shows a block diagram of one embodiment of certain components of a water management system having features consistent with the principles of the present disclosure.

As shown in FIGS. 1 and 9, the cold water inlet 12 supplies water from a water source to the cold water chamber 19 contained within the housing unit 18 along with the hot water chamber 19. Each port 20 within the plurality of ports is either connected to the cold water chamber 17 or hot water chamber 19. Each port ma extend outside the housing unit 18 so that water lines may be connected to the ports 20 to supply water to designated fixtures 35. FIG. 7 shows a side view of the manifold's 10 housing unit 18 with a plurality of ports 20 to which water lines may be connected when the system is installed. As further shown in FIG. 7, in some embodiments, the housing unit 18 may have one or more brackets 70 for mounting the housing unit 18 to a wall or other structure. The cold water outlet 14 fluidly connects the cold water chamber 17 to a water heater 100. The hot water inlet 16 fluidly connects the water heater 100 to the hot water chamber 19 and supplies hot water to the hot water chamber 19. In some embodiments, the cold water inlet 12 and outlet 14 and hot water inlet 16 may each include a manual valve 15A-15C for manual control of water flow. In an embodiment, the cold water inlet 12 is a 1-inch inlet while the cold water outlet 14 and hot water inlet 16 are each ¾ inches in diameter. In some embodiments, each port 20 may include a manual valve 24 for manually controlling water flow through the port 20.

As shown in FIG. 1, in some embodiments, the system may include a plurality of labels 28. Each label within the plurality of labels 28 may be positioned adjacent and correspond to an individual port 20 within the manifold 10. The labels 28 may contain indicia that indicates to users what specific water fixture 35 is supplied by a given port 20. In some instances, such as with "Shower 1" and "Shower 2" shown in FIG. 1, a single fixture 35 (in this case, a shower head) has two designated ports 20. In this example, the port 20 labeled "Shower 1" supplies cold water to the shower head, and the port 20 labeled "Shower 2" supplies hot water to the same shower head.

Figure 8:
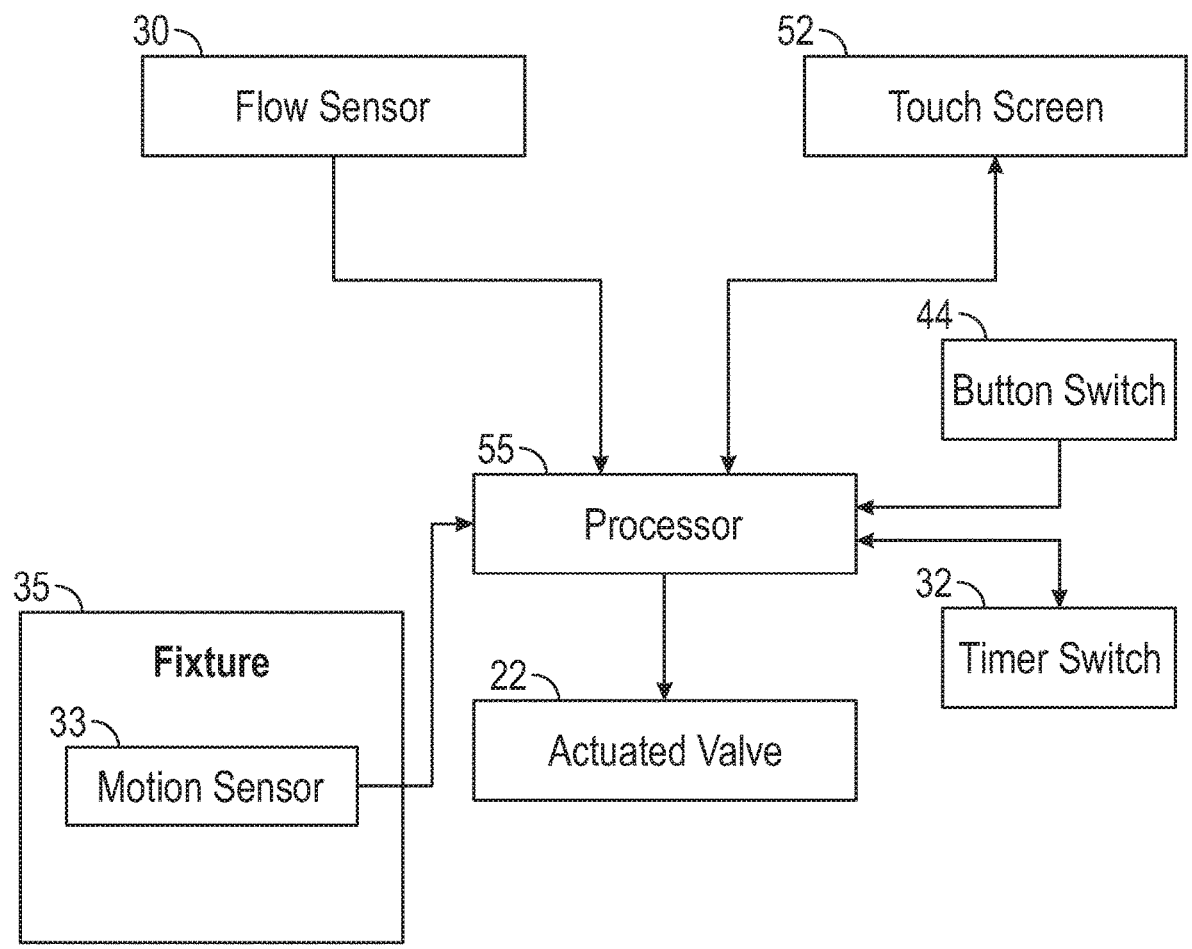
FIG. 8 shows a block diagram of one embodiment of certain components of a water management system having features consistent with the principles of the present disclosure.

In some embodiments, the actuated valve 22 associated with each port 20 may retain a default, open configuration such that water within the interior of the manifold 10 may be freely pass through the port 20. In some embodiments, each actuated valve 22 within the manifold 20 may comprise a solenoid valve. Each actuated valve 22 may be adapted to transition from the default, open configuration to a closed configuration that blockades passage of water through its corresponding port 20 upon receiving an electrical signal. In some embodiments, transmission of an electrical signal to each actuated valve 22 may be based on input provided by a switch and/or one or more sensors. In one embodiment, the each actuated valve 22 is operably connected to a flow sensor 30 and may be further operably connected to a motion sensor 33, a button switch 44, or timer switch 32, depending on the fixture 35 supplied by the port 20 to which the actuated valve 22 corresponds. As shown in FIG. 8, in some embodiments, the system may include a processor 55 that operably connects the flow sensor 30, motion sensor 33, button switch 44, and timer switch 32 to the actuated valves 22. In such embodiments, the processor 55 is configured to receive input from the flow sensor 30, motion sensor 33, button switch 44, and timer switch 32, and subsequently process the same. If the input received and processed from the flow sensor 30, motion sensor 33, button switch 44, and timer switch 32 meet a defined set of conditions for closure of an actuated valve 22, the processor 55 transmits a signal to the actuated valve 22 causing it to transition to a closed configuration. In some embodiments, the conditions required for transmission of a signal from the processor 55 to an actuated valve 22 may be based, at least in part, on the type of fixture 35 supplied by the port 20 to which the actuated valve 22 corresponds.

Figure 2:
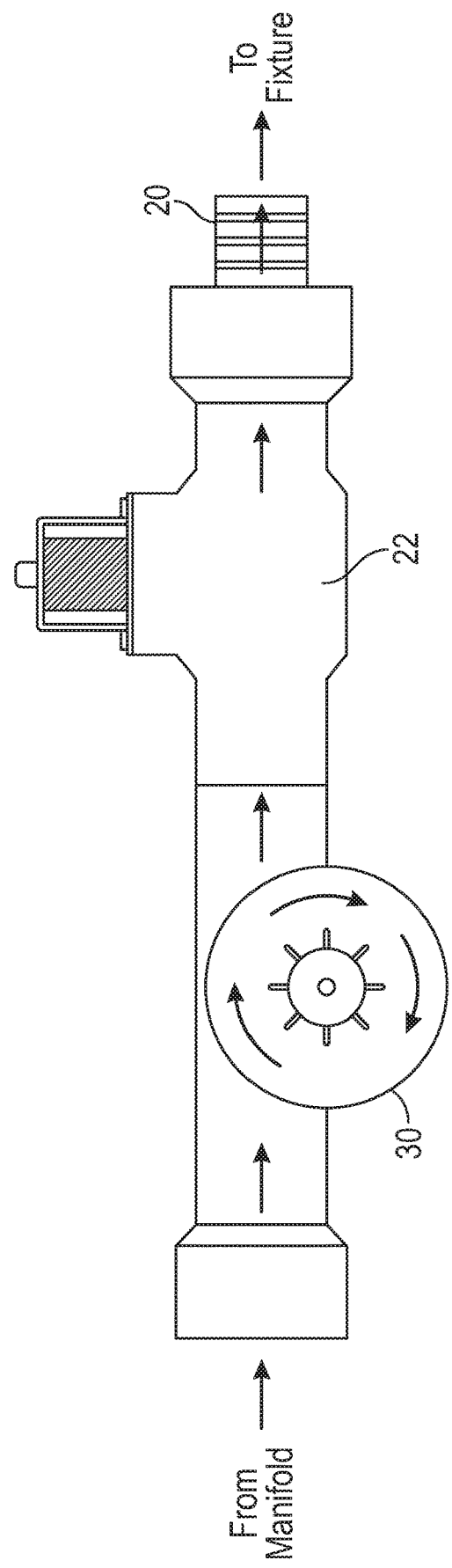
FIG. 2 shows a side view of one embodiment of a component of a water management system having features consistent with the principles of the present disclosure.

In an embodiment a flow sensor 30 adapted to detect water movement may be utilized for and operably connected to each actuated valve 22 within the manifold 10. FIG. 2 shows a detailed view of a port 20 having a flow sensor 30 in series with an actuated valve 22. For actuated valves 22 corresponding to ports 20 supplying manually operated indoor fixtures 35, such as sinks or bathtubs, one or more motion sensors 33 are installed near each fixture 35 and positioned to detect motion of a person who is manually operating the fixture 35 and/or utilizing water supplied from the fixture 35. In such embodiments, the motion sensor 33 and the flow sensor 30 are each operably connected to the actuated valve 22. When the motion sensor 33 detects motion, the normally open actuated valve 22 will not close regardless of whether the flow sensor 30 detects water flow through the port 20. Conversely, if the motion sensor 33 does not detect motion, the actuated valve 22 will automatically transition to a closed if the flow sensor 30 detects water flow through the port 20. Thus, when a user is operating the fixture, the actuated valve 22 will remain open. However, when a leak occurs, water flow will be detected due to the leak but motion will not be detected, which will cause the actuated valve 22 to automatically close, thereby limiting the amount of water discharged due to the leak. One or more lights 26 may be operably connected to the actuated valve 22. In such embodiments, the one or more lights may be configured to illuminate when the actuated valve 22 is closed due to a leak in order to indicate to a user that the actuated valve 22 is closed. In this way, the present system may prevent major damage caused by a break in water piping. Once the actuated valve 22 is closed, only water remaining in the pipe will leak, thereby limiting damage.

Figure 3:
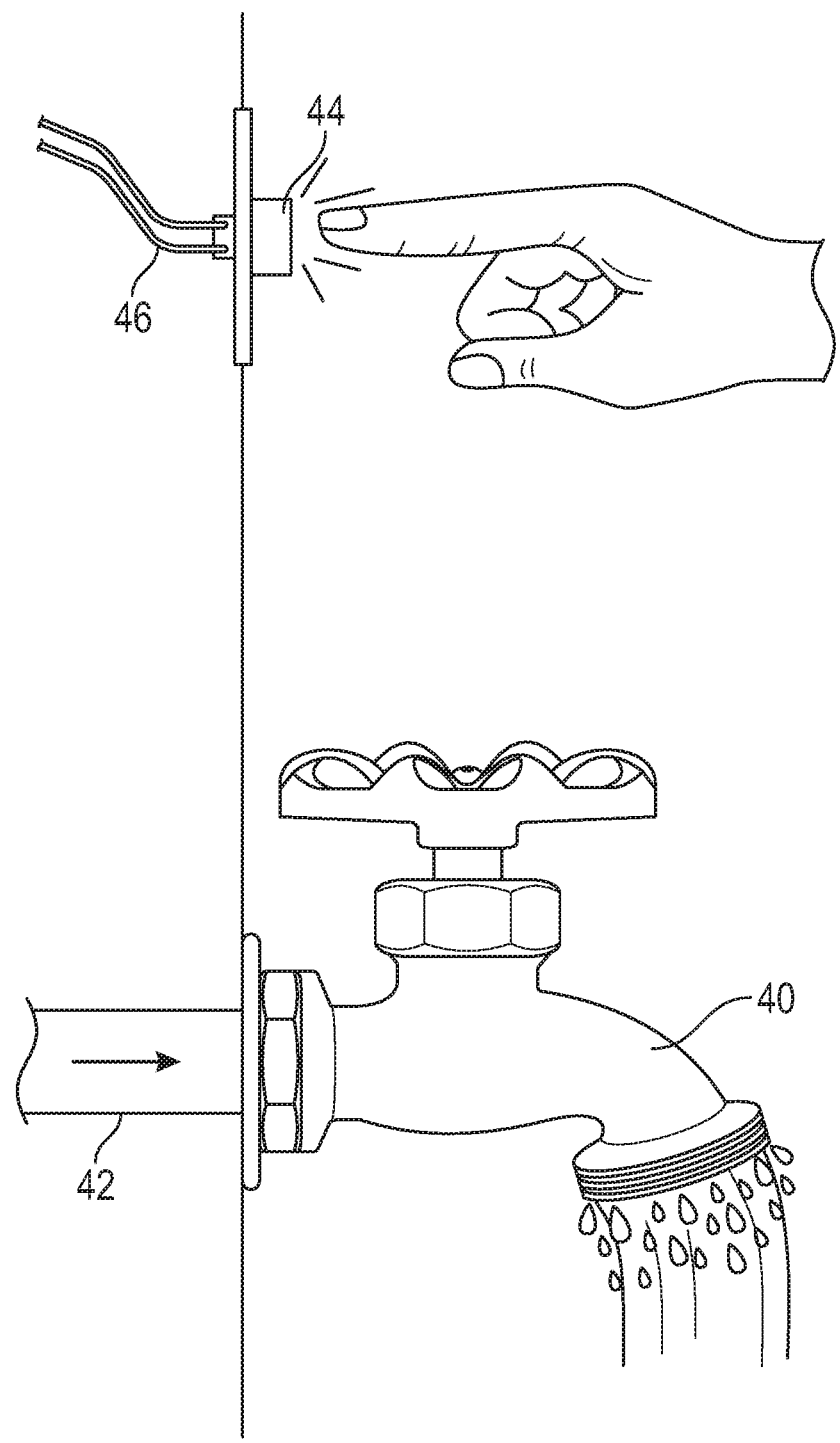
FIG. 3 shows a side view of one embodiment of a component of a water management system having features consistent with the principles of the present disclosure.

For manually operated outdoor fixtures 35, such as hose bibbs 40, a motion sensor 33 is typically not practical due to the potential to detect the motion of people or animals near an outdoor fixture that are not actively operating the fixture or using water supplied by the fixture. Instead, as shown in FIGS. 1 and 3, outdoor fixtures 40 may have a flow sensor 30 installed on the water supply port 20 and a push button switch 44 installed near the outdoor fixture 40, typically on a plate installed on a wall above or adjacent to the fixture. The button switch 44 and flow sensor 30 are each operably connected to the actuated valve 22. FIG. 3 shows wiring 46 that may be utilized to connect the button switch 44 to the processor 55 or to the actuated valve 22 direct. FIG. 3 further shows piping 42 that connects the outdoor fixture 40 to a port 20 on the manifold 10. To use the outdoor fixture 40, a user first presses the button of the push button switch 44, which disarms the actuated valve 22, meaning that the normally open actuated valve 22 will not close regardless of whether the flow sensor 30 detects water flow through the port 20 corresponding to the actuated valve 22. After the user is finished using the outdoor fixture 40, the user then presses the button of the button switch 44 again to arm the actuated valve 22, which is the default state when the fixture is not in use. When the actuated valve 22 is armed, water flowing through the port 20 indicates the presence of a leak. Thus, if the flow sensor 30 detects water flow while the actuated valve 22 is armed, the actuated valve 22 will automatically close to shut off the flow, thereby limiting damage from the leak.

Alternatively, for a manually operated fixture utilizing a button switch 44, the actuated valve 22 may be in a normally closed position when the fixture is not being operated. In this embodiment, the user presses the button of the button switch 44 to open the normally closed actuated valve 22 to allow water flow so that the port 20 may be used to supply water. When the user is finished using the fixture, the user may then press the button of the button switch 44 again to move the valve back to the closed position, which will limit any amount of water that may leak from the piping in the event of a leak.

Figure 4:
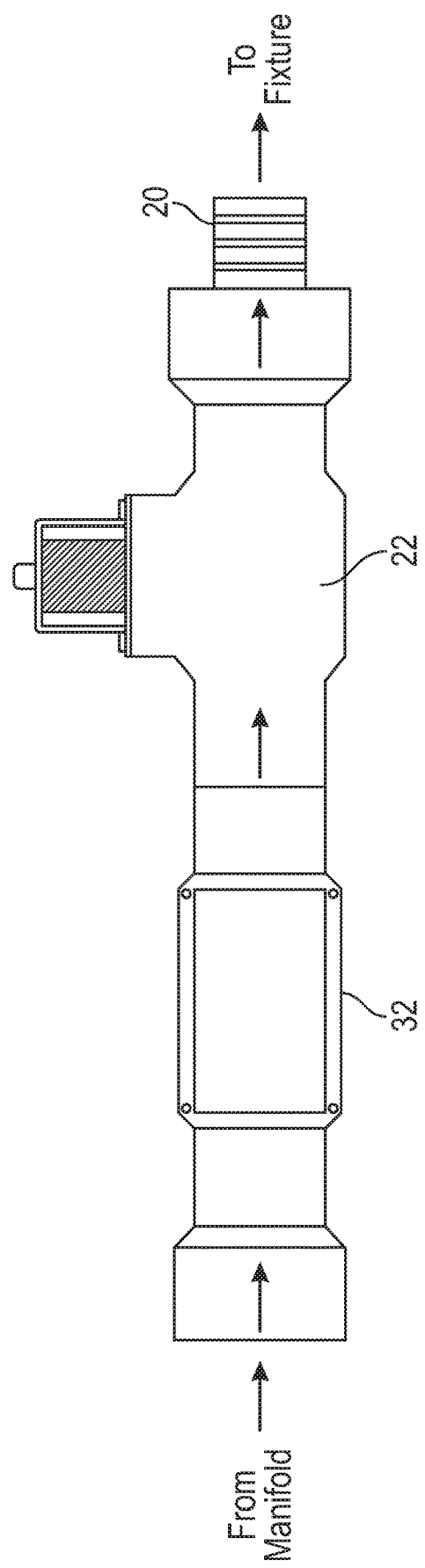
FIG. 4 shows a side view of one embodiment a component of a water management system having features consistent with the principles of the present disclosure.

For ports 20 supplying fixtures 35 that operate on cycles, such as dishwashers, ice makers, washing machines, a timer switch 32 may be installed on the port 20 and operably connected to an actuated valve 22. FIG. 4 shows a detailed view of a port 20 having a timer switch 32 in series with an actuated valve 22. In some embodiments, the flow sensor 30 associated with the actuated valve 22 corresponding to a port 20 supplying a fixtures operating on cycles may be operably connected to the timer switch 32 as well as the actuated valve 22 itself. Each timer switch 32 may be set for a specified period of time that is adequate to allow the fixture 35 to run a complete cycle. For instance, a toilet typically takes about one minute, and an ice maker typically takes about 5-10 seconds to run a complete cycle. Once water begins to flow for a cycle, the water is allowed to flow only for the amount of time set on the timer switch 32. In the event of a leak, the leak will cause water to continue to flow for a period of time longer than the time set on the timer switch 32. If a leak occurs, the flow sensor 30 is configured to send a input to the processor 55, which when processed, results in the processor 55 transmitting a signal to the actuated valve 22 that causes it to transition to a closed configuration, thereby limiting water damage from the leak. In other embodiments, the flow sensor 30 may be directly connected to the actuated valve 22.

In embodiments wherein the system includes a water heater 100, the cold water outlet 14 and the hot water inlet 16 may also each be equipped with an actuated valve 22 having a default, open configuration. In such embodiments, a drain pan may be disposed at the bottom of the water heater. A water sensor may be disposed within the bottom of the drain pan to detect the presence of water in the pan. In the event that the water heater 100 or associated piping leaks or bursts, the leaking water will collect in the pan and will be detected by the water sensor. In such embodiments, upon detecting water, the water sensor will then send a signal to at least one of the normally open actuated valve 22 on the cold water inlet 14 supplying water to the water heater 100 or a processor 55 operably connected to the actuated valve 22, which will cause the actuated valve 22 to close in order to limit the amount of water that leaks. The water sensor may also send a signal to at least one of the actuated valve 22 on the hot water inlet 16 or a processor 55 operably connected to the actuated valve 22 to close the actuated valve 22 and prevent backflow from the hot water chamber 19 of the manifold 10 into the water heater 100. Thus, the water heater 100 will be isolated in the event of a leak.

Figure 5:
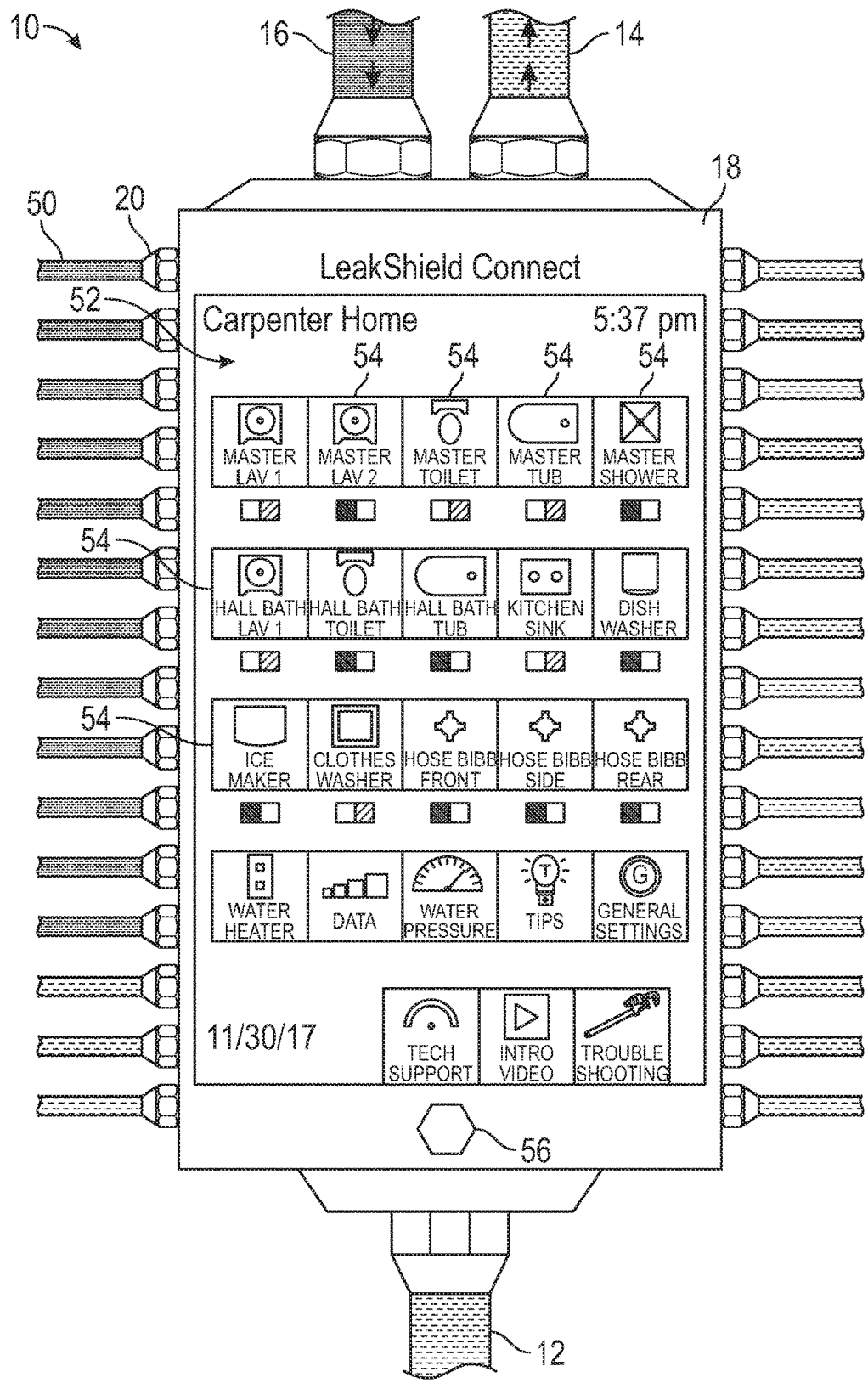
FIG. 5 shows an elevational view of one embodiment of a manifold having features consistent with the principle disclosure for use in a water management system.
Figure 6:
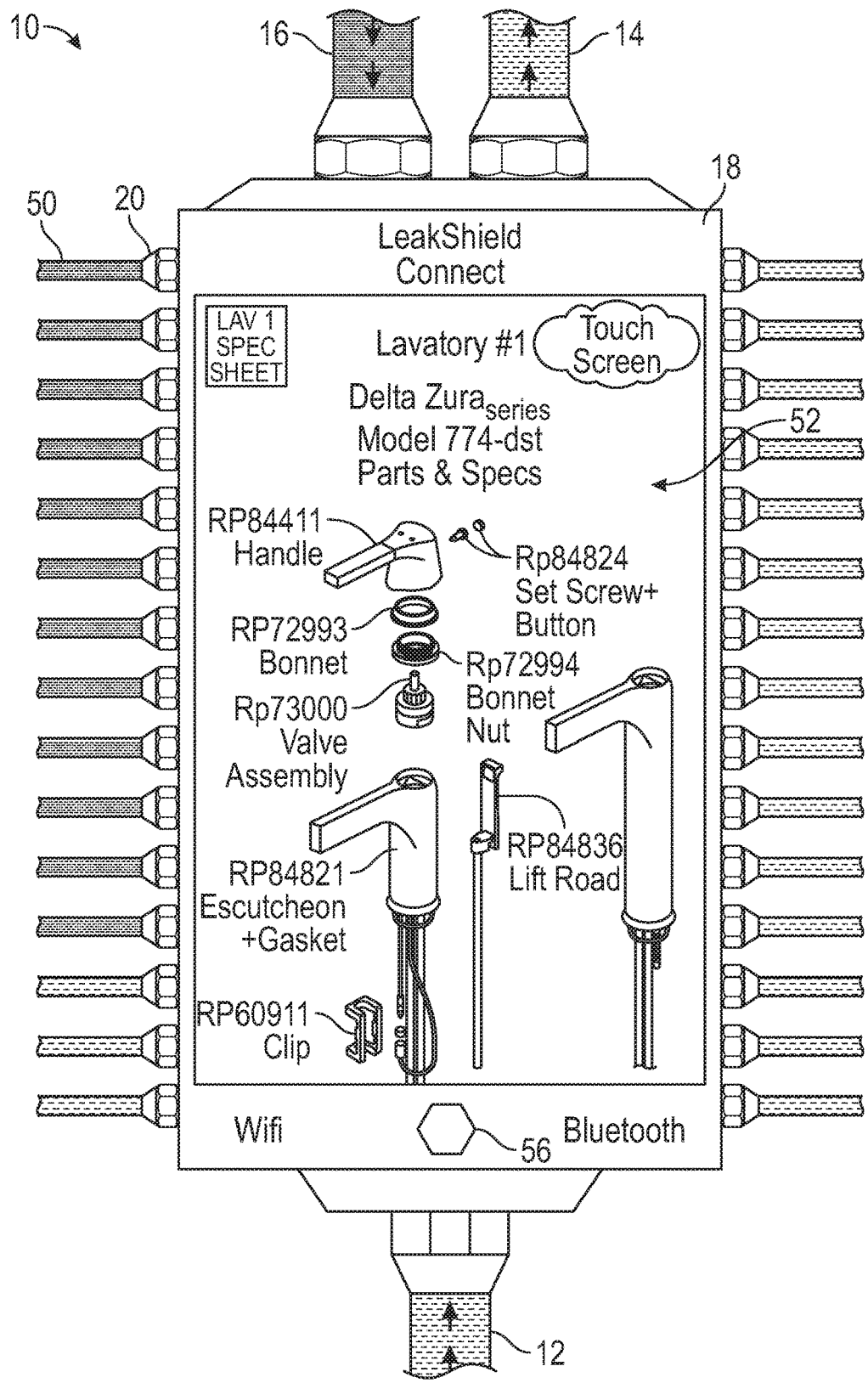
FIG. 6 shows an elevational view of one embodiment of a manifold having features consistent with the principles of the present disclosure for use in a water management system.

FIGS. 5-7 show an illustrative example of a water distribution manifold 10 in accordance with another embodiment of the present disclosure. The manifold 10 is housed within a housing unit 18 having an external touch screen 52 operably connected to and configured to operate the system. As shown in FIG. 5, the touch screen 52 may display one or more screen tiles 54 that correspond to a fixture 35 to which the manifold 10 supplies water. The tile 54 for a fixture 35 may allow a user to utilize various function of the tile by pressing on the tile 54. For instance, in some embodiments, the touch screen 52 may be operably connected to the actuated valve 22 of each port 20 within the manifold 10 so that users may close or open the actuated valve 22 of a port by interacting with the touch screen 52. In some embodiments, the touch screen may be operably connected to the actuated valves 22 within the manifold 10 via a processor 55, as shown in FIG. 8. In some embodiments, the manual valves 24 of the ports 20, actuated valves 22, flow sensors 30, and timer switches 32 may be located inside the housing unit 18, while the ports 20 extend outside the housing unit and connect to water lines 50 that each connect to individual fixtures 35.

FIG. 5 shows an illustrative display of the touch screen 52 showing a plurality of tiles 54, each corresponding to a fixture 35 supplied by the manifold 10 or to other features of the system, such as a general system settings tile, a data tile that displays system data, a water pressure tile that displays water pressure readings taken within the water distribution system, a "tips" tile that displays user tips, a tech support tile that connects a user to technical support, an introduction tile that provides instructions on using the system, and a trouble shooting tile. It is understood, however, that the touch screen 42 shown in FIG. 5 is illustrative and may contain additional, different, or modified tiles relating to additional or different fixtures or system features. As shown in FIG. 7, in some embodiments, the housing unit 18 may include a power jack, which may utilize a three-prong detachable electronics power cord, and may have USB and/or HDMI ports for servicing the system or transferring system data to a drive. In case of a power outage, the system preferably has a backup battery.

In some embodiments, as shown in FIG. 5, the touch screen 52 may be adapted to displays a "home" screen that can be reached by a user at any point by pressing a home button 56. The home screen allows the user to access all of the features of the system. For example, in some embodiments, the user can press on one of the tiles 54 to obtain various information relating to the fixture 35 associated with the pressed tile. FIG. 6 illustrates an example screen that may be displayed on the touch screen 52 when pressing a tile 54, in this case the "Master Lay 1" tile on the home screen. As shown in FIG. 6, a complete specification sheet relating to a designated water fixture installed in the master lavatory is displayed. The touch screen 52 may be adapted in some embodiments to display information such as the model number, brand, and series of a fixture 35 supplied by the manifold 10. In some instances, the touch screen 52 may be further adapted to display related parts and part numbers for use with a specific fixture 35 associated with a user-selected tile 54. In an embodiment, the system may further include memory for storing various data related to all fixtures 35 supplied by the manifold 10. In one embodiment, the touch screen 52 and memory may be operably connected such that a user may input and store data into memory by interacting with the touch screen 52. In some embodiments, water flow data, water pressure data, and other types of system data may be collected via one or more sensors or switches provided herein, compiled, and subsequently stored within the system so that such data may be accessed via the touch screen 52 by selecting one or more tiles 54. In some instances the touch screen may be configured to show current operating data and/or historic data of the system.

In some embodiments, one or more components of the system, such as the display screen 52, may have Wi-Fi and/or Bluetooth capability so that the system may connect to the internet. In such embodiments, the system may provide options for ordering new fixtures or other parts via the touch screen 52. Further, in such embodiments, internet connectivity may allow the user to connect to technical support via the "tech support" tile on the home screen. In some instances, one or more software application may also be associated with the system such that users can connect to the system via the internet. The one or more software applications may be downloaded to a remote computer or smartphone so that the remote device may be used to control the system remotely via the internet connection. In such embodiments, the remote device may be used to control all features of the system that may be controlled using the touch screen.

In an embodiment, as shown in FIG. 5, each tile 54 may have one or more lights associated therewith. In one such embodiment, each tile 54 may have a red and a green light associated therewith. The green light illuminates when a specific fixture 35 supplied by the manifold 10 is in use, and the red light illuminates when the specific fixture 35 is not in use, based on flow data from a flow sensor 30. In addition, the touch screen 52 may display an additional light adjacent to each tile 54 that illuminates when the normally open actuated valve 22 is closed due to a leak. Optionally, a designated alert may appear on the touch screen 52 when an actuated valve is closed due to a leak. The alert may also be sent to a remote device such as a smartphone on which a software application for the system is installed. Once the leak has been repaired, the actuated valve 22 may be reset via the touch screen 52 or the software application.

The touch screen 52 may perform various additional functions relating to each of the fixtures 35 supplied by the manifold 10 or to the system as a whole. For instance, for fixtures operating on a cycle and having a timer switch 32, the user may change the cycle time set on the timer switch 32 via the touch screen 52. In addition, some fixtures 35 supplied by the manifold 10 may have an additional automated valve operably connected to the system that allows the user to operate the fixture via the touch screen or remotely via the software application. For instance, in one embodiment, a user may remotely turn on a sprinkler system to water a lawn via the software application.

The foregoing description of the embodiments of the present disclosure has been presented for purposes of illustration and description. It is not intended to be exhaustive or to limit the present disclosure to the precise form disclosed, and modifications and variations are possible in light of the above teachings or may be acquired from practice of the present disclosure. The embodiments were chosen and described in order to explain the principles of the present disclosure and its practical application to enable one of skill in the art to utilize the present disclosure in various embodiments and with various modifications as are suited to the particular use contemplated.

What is claimed is:

1. A water management system for interconnection between a water source and a plurality of fixtures, the system comprising: a manifold having an inlet adapted to receive water from the water source and a plurality of ports for supplying water from the manifold to the plurality of fixtures, each port of the plurality of ports having an actuated valve for regulating water flow from an interior of the manifold to the port to which the actuated valve corresponds, the actuated valve of each port being operably connected to at least one of a switch and one or more sensors, wherein the actuated valve of each port is adapted to transition to a closed configuration based on input provided by the at least one of a switch and one or more sensors; an external touch screen mounted on said manifold operably connected to and configured to operate said system, said screen displaying tiles that correspond to said fixtures allowing a user to utilize various functions of a tile by pressing said tile, and a motion sensor installed adjacent each indoor fixture of the plurality of fixtures for detecting motion by a user manually operating the corresponding indoor fixture for preventing said manually operating indoor fixture from being shut down; and for manually operated outdoor fixtures of the plurality of fixtures, instead of use of motion sensors, each said outdoor fixture is provided with a flow sensor and a push button switch adjacent thereto to disarm the corresponding actuated valve from controlling flow through said outdoor fixture regardless of whether the flow sensor detects water flow, said push button switch adapted to rearm said actuated valve to control flow through said outdoor fixture when the push button switch is pressed again.

2. The system of claim 1, wherein each port of the plurality of ports further includes a manual valve for regulating water flow from the interior to the port to which the manual valve corresponds.

3. The system of claim 1, wherein the inlet has a manual valve for regulating water flow from the water source to the manifold.

4. The system of claim 1, wherein the at least one of a switch and one or more sensors includes a switch and a sensor.

5. The system of claim 4, wherein the switch comprises a button switch.

6. The system of claim 4, wherein the switch comprises a timer switch and the sensor comprises a water flow sensor.

7. The system of claim 1, wherein the interior includes a first chamber for supplying cold water to a first set of ports within the plurality of ports and a second chamber for supplying hot water to a second set of ports within the plurality of ports.

8. The system of claim 7, wherein the manifold further includes an outlet, the inlet and the outlet each being fluidly connected to the first chamber.

9. The system of claim 8, further comprising a water heater, and wherein the manifold further includes a second inlet fluidly connected to the water heater and the second chamber.

10. The system of claim 1 further comprising a housing unit, the manifold being housed within the housing unit.

11. The system of claim 10, wherein the touch screen is configured to display information about at least one of a port within the plurality of ports, a fixture within the plurality of fixtures to which the port corresponds, the actuated valve of the port, and the at least one of a switch and one or more sensors operably connected to the actuated valve.

12. The system of claim 1, further comprising a plurality of labels, wherein each label within the plurality of labels corresponds to a port within the plurality of ports and identifies a fixture within plurality of fixtures to which the port corresponds.

* * * * *